US011683072B2

(12) United States Patent
Bauer et al.

(10) Patent No.: US 11,683,072 B2
(45) Date of Patent: *Jun. 20, 2023

(54) PARTITIONED WIRELESS COMMUNICATION SYSTEM WITH REDUNDANT DATA LINKS AND POWER LINES

(71) Applicant: Aptiv Technologies Limited, St. Michael (BB)

(72) Inventors: Lee Bauer, Birmingham, MI (US); Martin Bornemann, Nuremberg (DE); Christian Schäfer, Bochum (DE)

(73) Assignee: Aptiv Technologies Limited, St. Michael (BB)

( * ) Notice: Subject to any disclaimer, the term of this patent is extended or adjusted under 35 U.S.C. 154(b) by 140 days.

This patent is subject to a terminal disclaimer.

(21) Appl. No.: 17/367,225

(22) Filed: Jul. 2, 2021

(65) Prior Publication Data

US 2021/0336654 A1 Oct. 28, 2021

Related U.S. Application Data

(63) Continuation of application No. 16/552,870, filed on Aug. 27, 2019, now Pat. No. 11,101,846.

(Continued)

(51) Int. Cl.
*H04B 5/00* (2006.01)
*H04B 1/3822* (2015.01)
(Continued)

(52) U.S. Cl.
CPC ......... *H04B 5/0037* (2013.01); *H01Q 1/3275* (2013.01); *H04L 67/12* (2013.01); *H04W 4/44* (2018.02); *H04W 40/20* (2013.01)

(58) Field of Classification Search
CPC .... H04B 5/0037; H04B 1/3822; H04B 3/544; H04W 4/44; H04W 40/20; H04W 4/40;
(Continued)

(56) References Cited

U.S. PATENT DOCUMENTS 6,046,511 A 4/2000 Kincaid
6,421,593 B1 * 7/2002 Kempen ................. B65F 3/045
701/48

(Continued)

FOREIGN PATENT DOCUMENTS

CN 103354991 A 10/2013
CN 104038253 A 9/2014
(Continued)

OTHER PUBLICATIONS

"Corrected Notice of Allowance", U.S. Appl. No. 16/552,870, filed May 17, 2021, 2 pages.

(Continued)

*Primary Examiner* — Inder P Mehra
(74) *Attorney, Agent, or Firm* — Sawtooth Patent Group PLLC

(57) ABSTRACT

Embodiments are disclosed for a partitioned wireless communication system for a vehicle with redundant data links and power lines. In an embodiment, a system comprises: a communication gateway unit (CGU) located at a first location of the vehicle includes a communication processor, a first power supply, and a first data interface. A remote wireless transceiver unit (RWTU) located at a second location of the vehicle includes a second data interface coupled to the first data interface using redundant data links, a power interface coupled the first power supply to the RWTU using redundant power lines, and wireless transceiver(s) coupled to antenna(s) on the vehicle. The communication processor detects a loss of a first data link or a first power line, and in (Continued)

response to the detecting, selecting a second data link or second power line to transfer data or power, respectively, between the CGU and the RWTU.

20 Claims, 3 Drawing Sheets

Related U.S. Application Data

(60) Provisional application No. 62/723,448, filed on Aug. 27, 2018.

(51) Int. Cl.
| | |
|---|---|
| *H04B 3/54* | (2006.01) |
| *H01Q 1/32* | (2006.01) |
| *H04L 67/12* | (2022.01) |
| *H04L 45/00* | (2022.01) |
| *H04L 45/28* | (2022.01) |
| *H04L 67/52* | (2022.01) |
| *H04L 67/56* | (2022.01) |
| *H04L 12/00* | (2006.01) |
| *H04W 4/44* | (2018.01) |
| *H04W 40/20* | (2009.01) |

(58) Field of Classification Search
CPC ..... H04W 76/15; H04W 76/18; H04W 84/22; H04L 67/12; H04L 45/22; H04L 45/28; H04L 67/28; H04L 67/18; H04L 12/00; H01Q 1/3275
See application file for complete search history.

(56) References Cited

U.S. PATENT DOCUMENTS

| | | | |
|---|---|---|---|
| 11,101,846 B2 | 8/2021 | Bauer et al. | |
| 2003/0043779 A1 | 3/2003 | Remboski et al. | |
| 2003/0179773 A1* | 9/2003 | Mocek | H04L 67/61 370/468 |
| 2004/0078715 A1* | 4/2004 | Vth | G05B 19/0425 714/E11.059 |
| 2005/0104411 A1* | 5/2005 | Yoshida | B60J 7/145 296/107.17 |
| 2006/0117089 A1 | 6/2006 | Karam | |
| 2006/0291657 A1 | 12/2006 | Benson et al. | |
| 2009/0034540 A1* | 2/2009 | Law | H04L 67/12 725/77 |
| 2009/0158360 A1 | 6/2009 | Diab et al. | |
| 2010/0234071 A1 | 9/2010 | Shabtay et al. | |
| 2011/0282525 A1 | 11/2011 | Kraeling et al. | |
| 2014/0092872 A1 | 4/2014 | Rentschler | |
| 2015/0245280 A1 | 8/2015 | Zhou et al. | |
| 2015/0256356 A1 | 9/2015 | Armbruster et al. | |
| 2016/0033965 A1 | 2/2016 | Kopetz | |
| 2016/0255579 A1 | 9/2016 | Tong et al. | |
| 2016/0366539 A1 | 12/2016 | Thanayankizil et al. | |
| 2017/0047962 A1 | 2/2017 | Gururaj et al. | |
| 2017/0055104 A1 | 2/2017 | Wegelin et al. | |
| 2017/0078142 A1 | 3/2017 | Montrichard et al. | |
| 2017/0092137 A1 | 3/2017 | Hiebi | |
| 2017/0111186 A1 | 4/2017 | Tochio | |
| 2017/0163525 A1* | 6/2017 | Fedor | H04L 12/66 |
| 2017/0277152 A1 | 9/2017 | Liu et al. | |
| 2017/0366430 A1 | 12/2017 | Seo et al. | |
| 2018/0086210 A1* | 3/2018 | Berels | B60L 1/00 |
| 2019/0364492 A1* | 11/2019 | Azizi | H04W 48/16 |
| 2020/0067570 A1 | 2/2020 | Bauer et al. | |

FOREIGN PATENT DOCUMENTS

| | | |
|---|---|---|
| CN | 105635981 A | 6/2016 |
| CN | 106850799 | 6/2017 |
| CN | 107499374 | 12/2017 |
| DE | 10131135 | 1/2003 |
| JP | 2004249772 A | 9/2004 |
| JP | 2007196737 A | 8/2007 |

OTHER PUBLICATIONS

"Extended European Search Report", EP Application No. 19193180.7, dated Jan. 2, 2020, 8 pages.
"Extended European Search Report", EP Application No. 21153849.1, dated Apr. 22, 2021, 5 pages.
"Foreign Office Action", DK Application No. PA2018706874, dated Jun. 8, 2020, 5 pages.
"Foreign Office Action", Dutch Application No. 201870684, dated Jan. 22, 2021, 4 pages.
"Non-Final Office Action", U.S. Appl. No. 16/552,870, filed May 27, 2020, 9 pages.
"Notice of Allowance", U.S. Appl. No. 16/552,870, filed Apr. 6, 2021, 9 pages.
"Extended European Search Report", EP Application No. 21209689.5, dated Feb. 25, 2022, 12 pages.
"Foreign Office Action", CN Application No. 201910789344.8, dated Jan. 5, 2023, 14 pages.
"Foreign Office Action", CN Application No. 201910789344.8, dated Oct. 19, 2022, 19 pages.

* cited by examiner

PARTITIONED WIRELESS COMMUNICATION SYSTEM WITH REDUNDANT DATA LINKS AND POWER LINES

CROSS-REFERENCE TO RELATED APPLICATIONS

This application is a continuation application of U.S. application Ser. No. 16/552,870, filed Aug. 27, 2019, which claims priority to U.S. Provisional Application Ser. No. 62/723,448, filed Aug. 27, 2018, the entire contents of which are incorporated herein by reference.

TECHNICAL FIELD

This disclosure relates generally to vehicular wireless communication systems.

BACKGROUND

Conventional vehicular wireless communication systems are usually assembled in a crash-safe area of the vehicle or in an area close to vehicle antennas. If the systems are assembled in the crash-safe areas, high-frequency wiring harnesses are needed to connect the systems to antennas. If the systems are assembled in areas close to vehicle antennas, such as vehicle roofs, the systems can be exposed to high temperatures.

SUMMARY

Embodiments are disclosed for a partitioned wireless communication system with redundant data links and power lines.

In an embodiment, a system comprises: a communication gateway unit located at a first location of a vehicle, including a communication processor-circuit, a first power supply; and a first data interface; a remote wireless transceiver unit located at a second location of the vehicle including: a second data interface coupled to the first data interface using two or more data links; a power interface coupling the first power supply to the remote wireless transceiver unit using two or more power lines; and one or more wireless transceivers coupled to one or more antennas on the vehicle; and one or more storage devices storing instructions that when executed by the communication processor-circuit, cause the communication processor-circuit to perform operations comprising: detecting a loss of a first data link between the first data interface and the second data interface; and in response to the detecting, selecting a second data link to transfer data between the first data interface and the second data interface.

In an embodiment, the operations further comprise: detecting a loss or disruption of a first power line supplying power from the first power supply to the remote wireless transceiver unit; and in response to the detection of the loss or disruption to the first power line, selecting a second power line to supply power from the first power supply to the remote wireless transceiver unit.

One or more embodiments of the disclosed system provide one or more of the following advantages. To increase the reliability of data and power transfer within a vehicle, the vehicle includes a partitioned wireless communication system that includes redundant data links and power lines. In an embodiment, a remote wireless transceiver unit (RWTU) and a communication gateway unit (CGU) are placed at different locations in the vehicle, such that the RWTU is located proximate to vehicle antennas to minimize signal interference, and the CGU is located in a crash-safe area (typically mounted in a lower area of the vehicle). The redundant data links and power lines couple the RWTU with the CGU to allow for data and power transfer in the event that one of the data links or power lines has a loss or disruption due to an accident, severed wire, connector failure or any other event.

The details of the disclosed implementations are set forth in the accompanying drawings and the description below. Other features, objects, and advantages are apparent from the description, drawings, and claims.

DESCRIPTION OF DRAWINGS

The same reference symbol used in various drawings indicates like elements.

DETAILED DESCRIPTION

Figure 1:
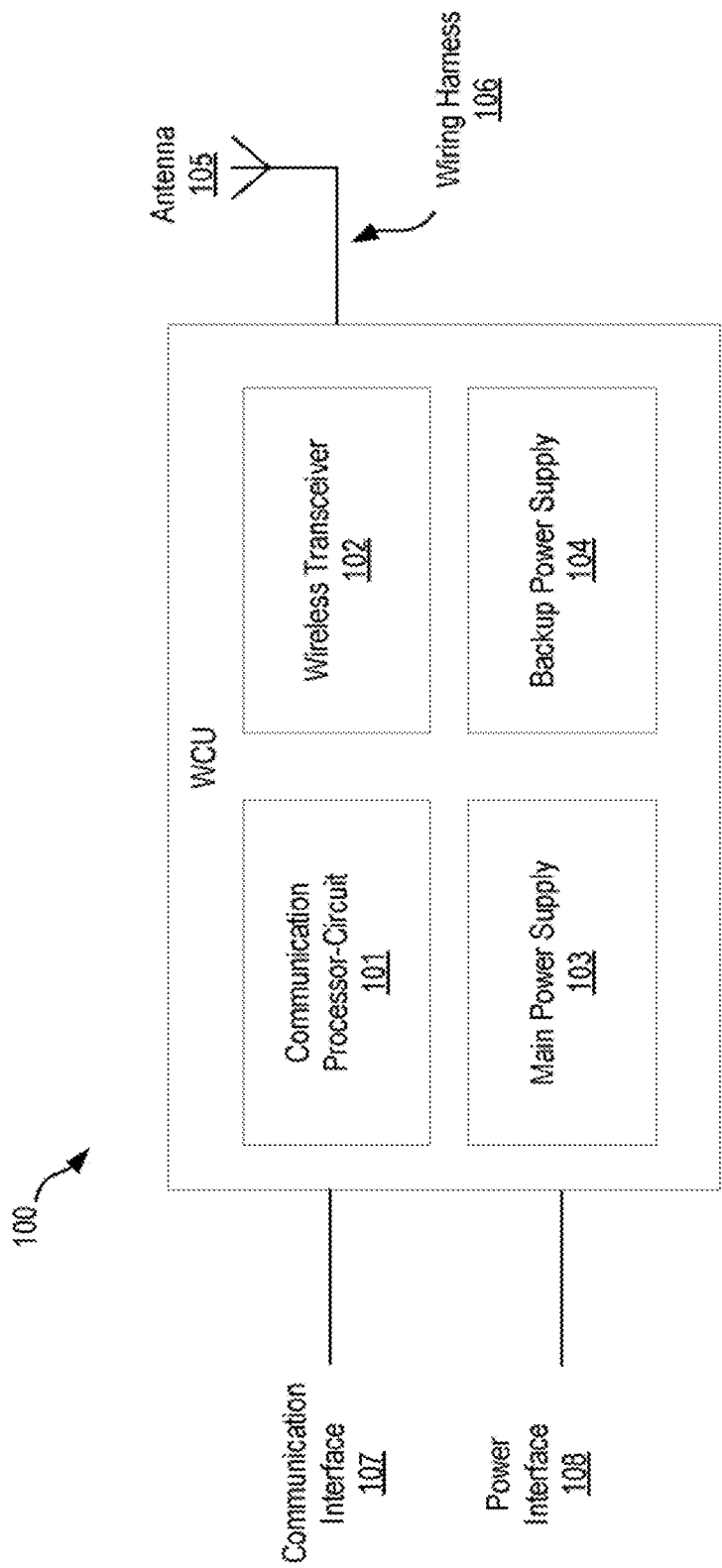
FIG. 1 is a block diagram of a conventional vehicular wireless communication unit, according to an embodiment.

Reference will now be made in detail to embodiments, examples of which are illustrated in the accompanying drawings. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the disclosed embodiments.

In the following description, for the purposes of explanation, numerous specific details are set forth to provide a thorough understanding of the disclosed embodiments. It will be apparent, however, that the disclosed embodiments may be practiced without these specific details. In other instances, well-known structures and devices are shown in block diagram form to avoid unnecessarily obscuring the disclosed embodiments.

In the drawings, specific arrangements or orderings of schematic elements, such as those representing devices, modules, instruction blocks and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

Further, in the drawings, where connecting elements, such as solid or dashed lines or arrows, are used to illustrate a connection, relationship or association between or among two or more other schematic elements, the absence of any such connecting elements is not meant to imply that no connection, relationship or association can exist. In other words, some connections, relationships or associations between elements are not shown in the drawings so as not to obscure the disclosure. In addition, for ease of illustration, a single connecting element is used to represent multiple connections, relationships or associations between elements. For example, where a connecting element represents a communication of signals, data or instructions, it should be understood by those skilled in the art that such element represents one or multiple signal paths (e.g., a bus), as may be needed, to affect the communication.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Several features are described hereafter that can each be used independently of one another or with any combination of other features. However, any individual feature may not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in the specification.

Problem Overview

FIG. 1 is a block diagram of a conventional vehicular wireless communication unit (WCU) 100, according to an embodiment. WCU 100 includes communication processor-circuit 101, wireless transceiver 102, main power supply 103 and backup power supply 104 (hereafter also referred to as "WCU components"). Wireless transceiver 102 is coupled to antenna 105 through wiring harness 106. Some examples of wiring harness 106 include but are not limited to: unshielded twisted pairs, shielded twisted pairs, coaxial cables, unshielded parallel pairs, shielded parallels and optical media, or any combination thereof.

WCU 100 provides wireless services (e.g., Internet connectivity, Vehicle-to-Vehicle (V2V) communications) with remote devices and resources external to the vehicle. WCU 100 can be included in any type of vehicle, including an autonomous vehicle. As used herein, "vehicle" includes means of transposition of goods or people. For example, cars, buses, trains, airplanes, drones, trucks, boats, ships, submersibles, dirigibles, mobile robots, etc. A driverless car is an example of an AV. As used herein, an autonomous vehicle (AV) is a vehicle that possesses autonomous capability. As used herein, the term "autonomous capability" refers to a function, feature, or facility that enables a vehicle to be partially or fully operated without real-time human intervention, including without limitation fully autonomous vehicles, highly autonomous vehicles, and conditionally autonomous vehicles.

Communication processor-circuit 101 is coupled to communication interface 107 to receive data from a vehicle data network. For example, communication interface 107 can include circuitry for coupling to one or more vehicle bus systems, including but not limited to: Controller Area Network (CAN) bus, Local Internet Network (LIN), FlexRay, Ethernet, etc. The data can include but is not limited to the status of various vehicle components, sensor data and a perception of the vehicle's surrounding environment as captured by the vehicle's sensors (e.g., object detection data). The vehicle can include one or more sensors to detect passenger presence, airbag activation, tire pressure, vehicle location, road condition, etc., and output sensor data to the data network. Communication processor-circuit 101 analyzes the data and establishes a wireless communication session with a respondent external to the vehicle to receive the data. For example, if the data indicates that an airbag has activated and there are multiple passengers present in the vehicle, communication processor-circuit 101 initiates an emergency call to an eCall emergency alert system.

Wireless transceiver 102 includes circuitry (e.g., a wireless receiver and transmitter) and software/firmware (e.g., a TCP/IP stack) to establish and maintain a bi-directional communication channel with one or more respondents. For example, wireless transceiver 102 can set-up a real-time voice/video channel with an emergency call center that allows passengers in the vehicle to communicate with emergency call center personnel.

Main power supply 103 supplies power to WCU 100 to ensure proper functioning of WCU components. In an example, main power supply 103 draws power from a vehicle power network using power interface 108, monitors input/output voltage and/or current levels of WCU components and adjusts power delivery to each WCU component. In case of an emergency, main power supply 103 may stop functioning due to a loss of connection to the vehicle power network. Additionally, it may be unsafe for main power supply 103 to continue drawing power from the vehicle power network due to a risk of damage to the vehicle. In these cases, backup power supply 104 allows WCU 100 to continue functioning after main power supply 103 is disabled. For example, a battery interruption system (e.g., power switches, fuses) in WCU 100 can be configured to disconnect main power supply 103 from power interface 112 and use backup power supply 104 to power WCU components in the event of an emergency.

In one embodiment, WCU 100 is installed in a crash-safe area in the vehicle to reduce the likelihood of component damage in case of an accident. For example, WCU 100 can be installed in a passenger area, such as the space between the front and the back seats. Antenna 105, on the other hand, is usually installed on top of the vehicle roof to maximize signal strength. As a result, wiring harness 106 is used to couple antenna 105 to WCU 100 at wireless transceiver 102. This configuration, however, incurs an extra cost due to the requirement of wiring harness 106 and introduces signal interference due to the distance between antenna 105 and wireless transceiver 102. In another embodiment, WCU 100 is installed proximate to antenna 105 to reduce the length of wiring harness 106. For example, WCU 100 can be installed under the vehicle roof in a region proximate to antenna 105. In this configuration, however, WCU 102 is susceptible to temperature damage as the vehicle roof can become a heated environment.

Partitioned Wireless Communication System

Figure 2:
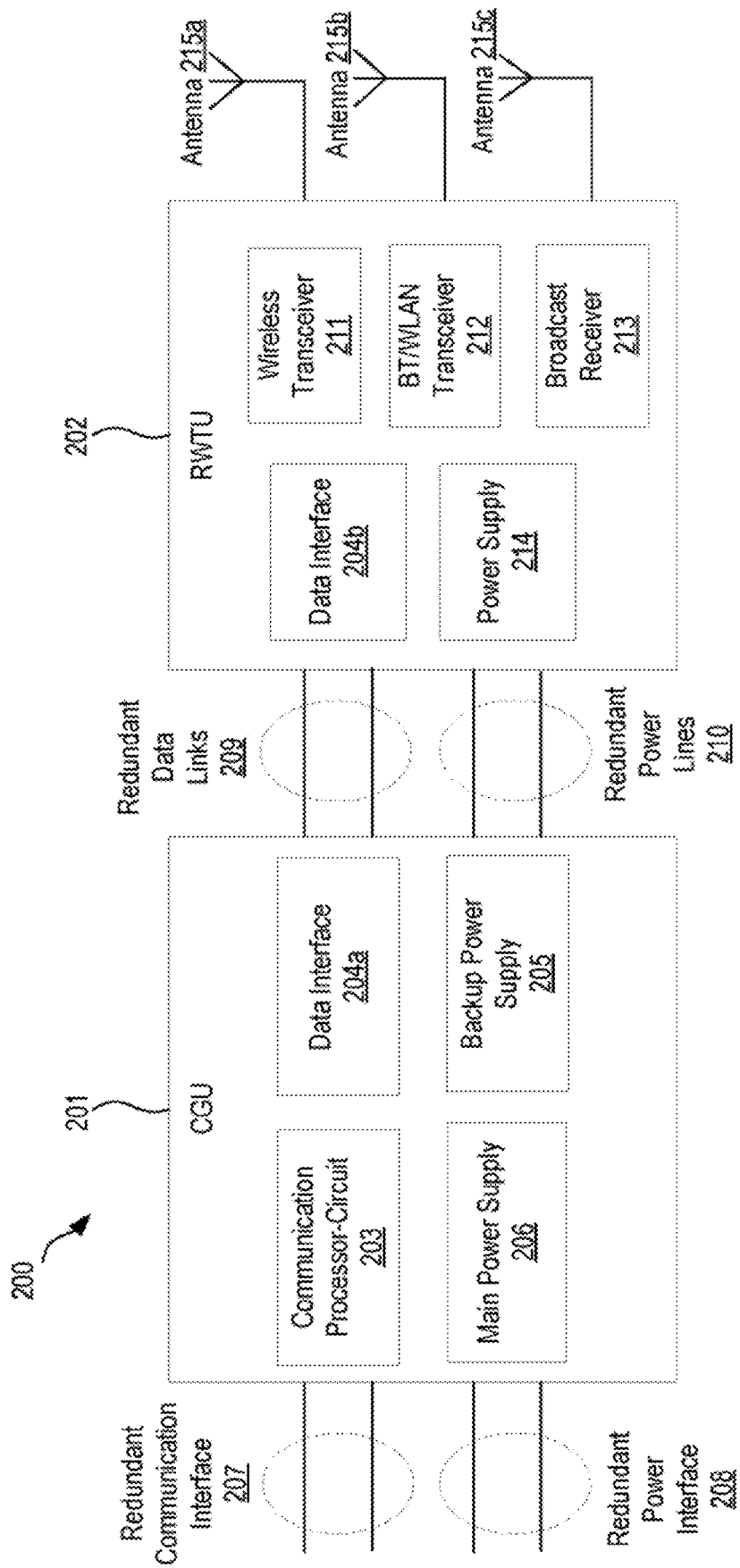
FIG. 2 is a block diagram of a partitioned vehicular wireless communication system with redundant internal data links and power lines, according to an embodiment.

FIG. 2 is a block diagram of partitioned vehicular wireless communication system (PWCS) 200 with redundant data links 209 and redundant power lines 210, according to an embodiment. As used herein, the term "partitioned" means to divide into parts. For example, a single hardware communication unit can be "partitioned" into two physically separate hardware units that are coupled together by data links and power lines and placed at different locations in a vehicle.

In the embodiment shown, PWCS 200 includes communication gateway unit (CGU) 201 coupled to remote wireless transceiver unit (RWTU) 202 by redundant data links 209 and redundant power lines 210. CGU 201 and RWTU 202 are placed at different locations in the vehicle. For example, CGU 201 can be placed at a lower area of the vehicle and RWTU 202 can be placed underneath the vehicle roof proximate to antennas 215a-215c. In an embodiment, each of CGU 201 and RWTU 202 include a housing that covers one or more integrated circuit chips or chipsets for wireless communications data interfaces and power. Any number or type of transmitter, receiver or transceiver, and any number or type of antennas 215a-215c (e.g., omnidirectional, directional, MIMO, antenna arrays) can be included in, or coupled to RWTU 202. One or more of antennas 215a-215c can be configurable, such that the antenna beams can be pointed in any desired direction manually or automatically. Multiple cellular antennas can be used for network connectivity, a global navigation satellite system (GNSS) antenna for navigation to emergency call systems and other location-based applications, satellite radio, radar, AM/FM radio, WiFi hotspot connectivity and dedicated short-range communications (DSRC) for vehicle-to-vehicle/infrastructure applications.

In the example shown, CGU 201 includes communication processor-circuit 203 (e.g., a central processing unit, controller, ASIC), data interface 204a, main power supply 206 and backup power supply 205. Data interface 204a includes circuitry (e.g., amplifiers, buffers, processors) for coupling CGU 201 to redundant data links 209. CGU 201 is further coupled to redundant communication interface 207 for interfacing with a dual-ring data network (e.g., a self-healing dual-ring network) in the vehicle. CGU 202 is further coupled to redundant power interface 208 for interface with a dual-ring power network in the vehicle.

CGU 201 is responsible for analyzing vehicle data and routing data and power to the RWTU 202. In an embodiment, communication processor-circuit 203 can receive vehicle data from redundant communication interface 207 coupled to the vehicle's data network. Main power supply 206 can draw power from redundant power interface 208 coupled to the vehicle's power network. In case of a data and/or power loss or disruption, redundant communication interface 207 and redundant power interface 208 select a different wiring path to deliver data and/or power to CGU 201.

RWTU 202 includes data interface 204b, cellular wireless transceiver 211, WLAN transceiver 212 (e.g., Bluetooth (BT), WiFi), broadcast receiver 213 (e.g., AM/FM radio, satellite radio) and power supply 214. Data interface 204b includes circuitry for coupling RWTU 202 to redundant data links 209. Wireless transceiver 211 can support multiple communication standards, including but not limited to: FM, AM, DAB, Sirius XM, Bluetooth, Wireless LAN, 4G/5G, DSRC, etc. Compared to WCU 100 shown in FIG. 1, PWCS 200 has an optimized structure that partitions communication processor-circuit 203 from wireless transceiver 211. As a result, RWTU 202 can be mounted in close proximity to antennas 215a-215c to reduce the cost due to the use of wiring harness 109. In an embodiment, RWTU 202 can be mounted underneath the vehicle roof.

In an embodiment, CGU 201 is coupled to RWTU 202 at data interfaces 204a and 204b. The coupling can be implemented using high-speed redundant data links 209. In case one of the data links suffers a loss or disruption, data interfaces 204a and 204b collectively select a different data link to transfer data. Some examples of data interfaces include but are not limited to: Ethernet, HDBaseT and PCIe. Some examples of data links include but are not limited to: unshielded twisted pairs, shielded twisted pairs, coaxial cables, unshielded parallel pairs, shielded parallels and optical media.

In an embodiment, main power supply 206 of CGU 201 receives power from a vehicle power network at redundant power interface 208 and delivers power to RWTU 202 using redundant power lines 210. For example, each of redundant power lines 210 can take a different wiring path in the vehicle. If one of the power lines suffers a loss or disruption, main power supply 206 selects a different power line to deliver power to power supply 214 of RWTU 202. Similarly, backup power supply 205 can be coupled to power supply 214 using redundant power lines 210.

In an embodiment, redundant data links 209 and redundant power lines 210 are routed in the vehicle to facilitate inspection and replacement. For example, each data link can be located along a path in the vehicle with a power line. In another example, one wiring harness can deliver both power and vehicle data.

In an embodiment, RTWU 202 is an expandable and can function with additional wireless communication protocols or standards. For example, RTWU 202 can include IC sockets (e.g., for receiving dual in-line packages) to allow new chips to be added to support new or updated wireless communication protocols or standards. In an embodiment, antennas 215a-215c can be reconfigured to couple to the additional wireless transceivers to communicate with other devices external to the vehicle using the added or updated communication standards.

Example Process

Figure 3:
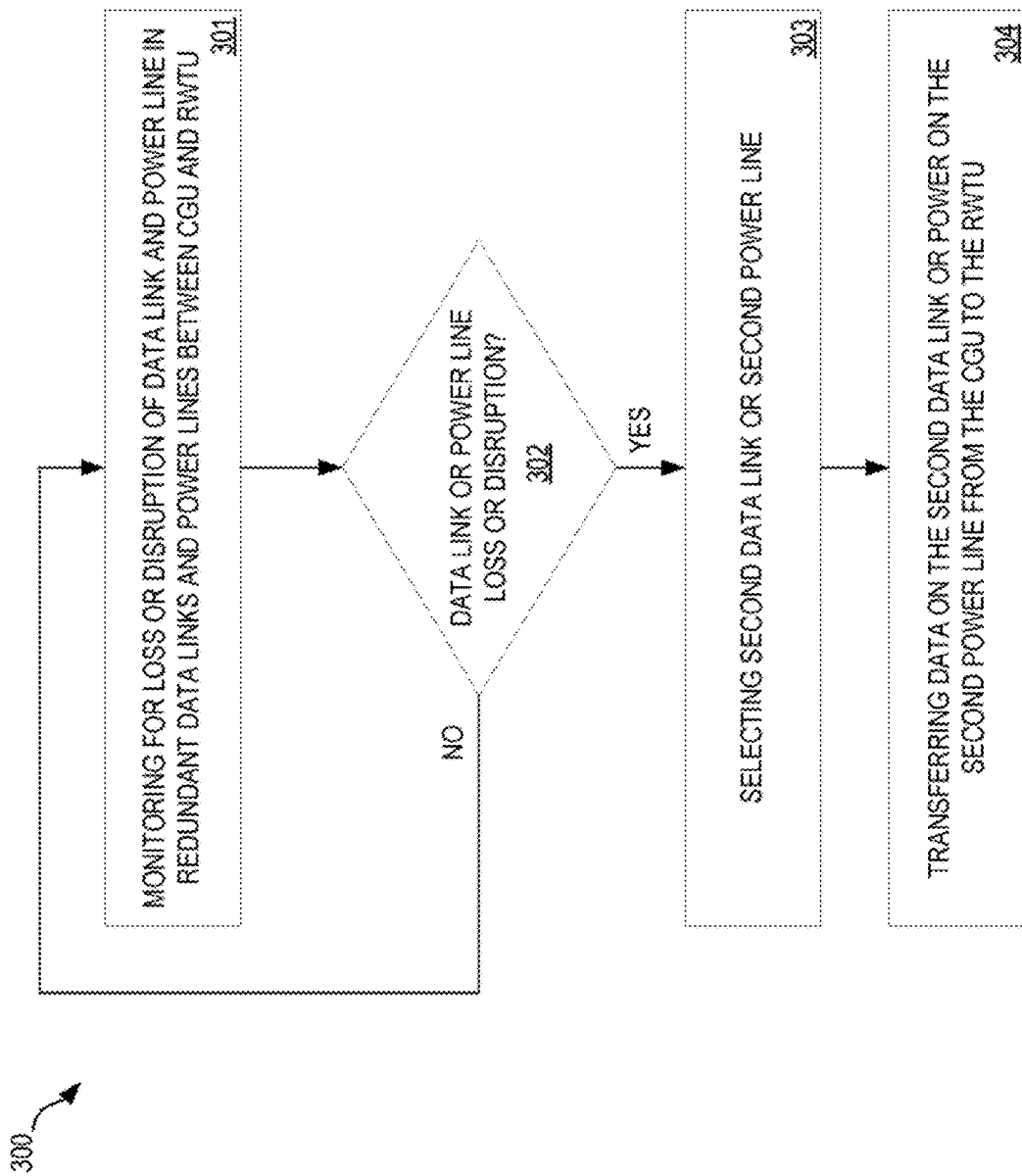
FIG. 3 is an example process for selecting a redundant data link or power line in the partitioned wireless communication system of FIG. 2 to transfer data or power, respectively, according to an embodiment.

FIG. 3 is a flow diagram of process 300 for using redundant data links and power lines in a wireless communication system to transfer data and power, respectively, from a CGU (e.g., CGU 201) to a RWTU (e.g., RWTU 202), according to an embodiment. Process 300 can be implemented using hardware (e.g., central processing unit (CPU), controller, ASIC), software, firmware or any combination thereof.

Process 300 begins by monitoring for loss or disruption (e.g., reduction in quality of service (QoS)) of a first data link and first power line of redundant data links or power lines, respectively, coupling a CGU and RWTU in a vehicle (301). For example, a loss or disruption of a first data link between the CGU and RWTU can be due to an accident that physically damages the first data link. Data interfaces in the CGU and RWTU include circuitry that monitor data traffic on the first data link and report any detected loss or disruption to a communication processor-circuit in the CGU. For example, if a data interface in the CGU stops receiving data from a data interface in the RWTU for a specified period of time, or there is reduction in data rate, an increase in data error and/or reduction in QoS, the data interface in the CGU can report the data loss or disruption to the communication processor-circuit. In an embodiment, monitoring includes port mirroring with a network switch to send a copy of network packets seen on one switch port to a network monitoring connection on another switch port.

Process 300 continues by determining (302) if there is loss or disruption of the first data link or first power line based on the monitoring. In accordance with the determination of a first data link loss or disruption, process 300 continues by selecting a second data link for data transfer between the CGU and RWTU (303). For example, in response to the reported potential disruption of the first data link, the communication processor-circuit and/or data interface circuitry in the CGU selects a second data link to transfer data to the RWTU. The communication processor-circuit and/or data interface circuitry can first verify that the first data link has been lost or disrupted. For example, the communication processor-circuit and/or data interface circuitry can cause test data to be transferred between the two data interfaces in the CGU and RWTU, and if the test data transfer fails, the communication processor-circuit and/or data interface in the CGU selects the second data link for data transfer between the CGU and RWTU.

If there is more than one redundant data link, selection can be based on ranking criteria, where a next highest-ranked data link can be selected for data transfer in place of the first data link. Any desired ranking criteria can be used, such as availability (operational) and electrical or performance characteristics of the data links (e.g., bandwidth, data rate).

In an embodiment, switching from the first data link to the second data link can be accomplished through one or more managed (e.g., smart switches) or unmanaged network switches in response to a command or instruction from a processor or controller using, for example, Simple Network Management Protocol (SNMP) or any other desired protocol.

In accordance with the determination (302) of a first power line loss or disruption, process 300 continues by selecting a second power line from the main power supply (or backup power supply) in the CGU to the power supply in the RWTU (303). The second power line can be selected from one or more redundant power lines. For example, a power supply in the RWTU can be configured to monitor (e.g., using a smart power switch) the power delivered from a main power supply in the CGU (e.g., monitoring current and/or voltage inputs/outputs), and if a loss or disruption of the first power line is detected, select the second power line for coupling with the power supply in the RWTU.

Process 300 continue by transferring data on the second data link or power on the second power line from the CGU to the RWTU (304).

While this document contains many specific implementation details, the implementation details should not be construed as limitations on the scope of what may be claimed but rather as a description of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can, in some cases, be excised from the combination, and the claimed combination may be directed to a sub combination or variation of a sub combination.

While logic flows or operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various software components in the embodiments described above should not be understood as requiring such separation in all embodiments, and it should be understood that the described software components can generally be integrated together in a single software program or multiple software programs.

In some instances, functions in claims will be preceded with the phrase "one or more." The phrase "one or more" as used herein includes a function being performed by one element, a function being performed by more than one element, e.g., in a distributed fashion, several functions being performed by one element, several functions being performed by several elements, or any combination of the above.

In some instances, claim elements will be preceded with the terms first, second, third and so forth. It should be understood that, although the terms first, second, third, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context."

Some aspects of the subject matter of this specification may include gathering and use of data available from various sources. The present disclosure contemplates that in some instances, this gathered data may identify a particular location or an address based on device usage. Such personal information data can include location-based data, addresses, subscriber account identifiers, or other identifying information. The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure.

What is claimed is:

1. A system comprising:
a communication gateway unit (CGU) configured to analyze vehicle data of a vehicle and located at a first location of the vehicle, the CGU comprising:
a first data interface; and
a processor configured to:
monitor data traffic of the vehicle data on a first data link between the first data interface and a second data interface; and
in response to a detection of a loss or a disruption of the first data link, select a second data link between to transfer the vehicle data between the first data interface and the second data interface; and
a remote wireless transceiver unit (RWTU) located at a second location of the vehicle that is different from the first location, the RWTU being configured to obtain the vehicle data from the CGU and transmit the vehicle data to an external device that is located away from the vehicle, the RWTU comprising:
the second data interface coupled to the first data interface using two or more data links; and
one or more wireless transceivers coupled to one or more antennas on the vehicle, wherein the second location is closer to each of the one or more antennas than the first location.

2. The system of claim 1, wherein the loss or the disruption of the first data link comprises at least one of the first data interface no longer receiving data from the second data interface for a first specified period of time, a reduction in data transfer rate of the data traffic on the first data link, an increase in data error of the data traffic on the first data link, or a reduction in Quality of Service of the data traffic on the first data link.

3. The system of claim 1, wherein the processor is further configured to:
verify the loss or the disruption of the first data link by causing test data to be transferred between the first data interface and the second data interface; and
in response to the test data not being transferred, a data transfer rate being below a first threshold, a data error being above a second threshold, a Quality of Service being below a third threshold, or a combination thereof, select the second data link to transfer data between the first data interface and the second data interface.

4. The system of claim 1, wherein:
the second data interface is coupled to the first data interface using at least three data links; and
the second data link has a ranking criteria larger than the ranking criteria of a third data link.

5. The system of claim 4, wherein the ranking criteria comprises at least one of an availability, a bandwidth, or a data transfer rate.

6. The system of claim 1, wherein the system further comprises a network switch, the network switch configured to switch from the first data link to the second data link in response to the selection of the second data link by the processor.

7. The system of claim 1, wherein the first location is in a lower area of the vehicle and the second location is underneath a roof of the vehicle.

8. The system of claim 1, wherein the processor is further coupled to a vehicle communication interface using redundant data links to obtain the vehicle data.

9. A method comprising:
monitoring, by a processor of a communication gateway unit (CGU) of a vehicle, data traffic of vehicle data on a first data link of redundant data links between the CGU and a remote wireless transceiver unit (RWTU) of the vehicle, the CGU being configured to analyze the vehicle data of the vehicle, the RWTU being configured to obtain the vehicle data from the CGU and transmit the vehicle data to an external device that is located away from the vehicle, the CGU and RWTU being placed at different locations of the vehicle, the RWTU being located at a location of the vehicle that is closer to each of one or more antennas than a location of the CGU; and
in response to a detection of a loss or disruption of the first data link, selecting, by the processor, a second data link of the redundant data links to transfer the vehicle data between the CGU and RWTU.

10. The method of claim 9, wherein the loss or the disruption of the first data link comprises at least one of the CGU no longer receiving data from the RWTU for a first specified period of time, a reduction in data transfer rate of the data traffic on the first data link, an increase in data error of the data traffic on the first data link, or a reduction in Quality of Service of the data traffic on the first data link.

11. The method of claim 9, the method further comprising:
verifying the loss or the disruption of the first data link by causing test data to be transferred between the CGU and the RWTU; and
in response to the test data not being transferred, a data transfer rate being below a first threshold, a data error being above a second threshold, a Quality of Service being below a third threshold, or a combination thereof, selecting the second data link to transfer data between the CGU and the RWTU.

12. The method of claim 9, wherein:
the RWTU is coupled to the CGU using at least three data links; and
the second data link has a ranking criteria larger than the ranking criteria of a third data link, wherein the ranking criteria comprises at least one of an availability, a bandwidth, or a data transfer rate.

13. The method of claim 9, wherein the method further comprises:
switching, by a network switch, from the first data link to the second data link in response to the selection of the second data link by the processor.

14. The method of claim 9, wherein the first location is in a lower area of the vehicle and the second location is underneath a roof of the vehicle.

15. The method of claim 9, wherein the method further comprises obtaining, by the processor and from a vehicle communication interface that is coupled to the processing using redundant data links, the vehicle data.

16. One or more non-transitory storage media storing instructions that, when executed by one or more computing devices of a vehicle, cause the one or more computing devices to:
monitor data traffic of vehicle data on a first data link of redundant data links between a communication gateway unit (CGU) of the vehicle and a remote wireless transceiver unit (RWTU) of the vehicle, the CGU being configured to analyze the vehicle data of the vehicle, the RWTU being configured to obtain the vehicle data from the CGU and transmit the vehicle data to an external device that is located away from the vehicle, the CGU and RWTU being placed at different locations of the vehicle, the RWTU being located at a location of the vehicle that is closer to each of one or more antennas than a location of the CGU; and in response to a detection of a loss or disruption of the first data link, select a second data link of the redundant data links to transfer the vehicle data between the CGU and RWTU.

17. The one or more non-transitory storage media of claim 16, wherein the loss or the disruption of the first data link comprises at least one of the CGU no longer receiving data from the RWTU for a first specified period of time, a reduction in data transfer rate of the data traffic on the first data link, an increase in data error of the data traffic on the first data link, or a reduction in Quality of Service of the data traffic on the first data link.

18. The one or more non-transitory storage media of claim 16, wherein the instructions, when executed by the one or more computing devices of the vehicle, further cause the one or more computing devices to:

verify the loss or the disruption of the first data link by causing test data to be transferred between the CGU and the RWTU; and in response to the test data not being transferred, a data transfer rate being below a first threshold, a data error being above a second threshold, a Quality of Service being below a third threshold, or a combination thereof, select the second data link to transfer data between the CGU and the RWTU.

19. The one or more non-transitory storage media of claim 16, wherein the first location is in a lower area of the vehicle and the second location is underneath a roof of the vehicle.

20. The one or more non-transitory storage media of claim 16, wherein the instructions, when executed by the one or more computing devices of the vehicle, further cause the one or more computing devices to:

obtain, from a vehicle communication interface that is coupled to the CGU using redundant data links, the vehicle data.

* * * * *